United States Patent
Maynard et al.

(10) Patent No.: US 7,032,108 B2
(45) Date of Patent: Apr. 18, 2006

(54) SYSTEM AND METHOD FOR VIRTUALIZING BASIC INPUT/OUTPUT SYSTEM (BIOS) INCLUDING BIOS RUN TIME SERVICES

(75) Inventors: Justin Maynard, Groton, MA (US); Ewan Milne, Stow, MA (US); Robert Oakes, Somerville, MA (US)

(73) Assignee: Egenera, Inc., Marlboro, MA (US)

( * ) Notice: Subject to any disclaimer, the term of this patent is extended or adjusted under 35 U.S.C. 154(b) by 221 days.

(21) Appl. No.: 10/428,682

(22) Filed: May 2, 2003

(65) Prior Publication Data

US 2004/0221150 A1 Nov. 4, 2004

(51) Int. Cl.
*G06F 15/177* (2006.01)
*G06F 9/00* (2006.01)
*G06F 9/24* (2006.01)
*G06F 9/455* (2006.01)

(52) U.S. Cl. .................. 713/2; 713/1; 713/100
(58) Field of Classification Search .......... 713/1, 713/2, 100; 710/8, 10
See application file for complete search history.

(56) References Cited

U.S. PATENT DOCUMENTS

| | | | |
|---|---|---|---|
| 4,855,905 A | | 8/1989 | Estrada et al. |
| 5,230,052 A | * | 7/1993 | Dayan et al. ............... 713/2 |
| 5,408,636 A | * | 4/1995 | Santeler et al. ............ 711/163 |
| 5,574,943 A | * | 11/1996 | Daftari ......................... 710/1 |
| 5,812,552 A | | 9/1998 | Arora et al. |
| 5,960,445 A | * | 9/1999 | Tamori et al. ............. 707/203 |
| 6,715,074 B1 | * | 3/2004 | Chaiken ..................... 713/164 |

OTHER PUBLICATIONS

Stevens, W. Richard, "TCP/IP Illustrated: The Protocols", 1994, Addison–Wesley, pp. 9–10 and 209.*
Comer, Douglas E., "Computer Networks and Internets", 1999, Prentice Hall, pp. 55–59.*

* cited by examiner

*Primary Examiner*—Lynne H. Browne
*Assistant Examiner*—James K. Trujillo
(74) *Attorney, Agent, or Firm*—Wilmer Cutler Pickering Hale and Dorr LLP

(57) ABSTRACT

A system and method to virtualize BIOS, including run time services. A processing system has a processor, a memory system with a predefined physical address space, a storage medium, and a communication medium between the processor and the storage medium. The processing system is operable in a pre-execution environment in which a specified portion of the physical address space is used to map basic input/output system (BIOS) run time service routines. The specified portion contains RAM memory. A BIOS virtualization system includes an image of the BIOS processor-executable instructions on the storage medium and processor-executable instructions that retrieve the BIOS image from the storage medium and store the BIOS image into the RAM memory mapped into the second specified portion of physical address space.

13 Claims, 4 Drawing Sheets

SYSTEM AND METHOD FOR VIRTUALIZING BASIC INPUT/OUTPUT SYSTEM (BIOS) INCLUDING BIOS RUN TIME SERVICES

BACKGROUND

1. Field of the Invention

The present invention relates to operating systems for computers. More particularly, the invention concerns loading basic input/output system (BIOS) into RAM as part of the boot sequence, as opposed to having such pre-stored in ROM.

2. Description of the Related Art

Modern computing architectures typically define a pre-execution environment that among other things specifies the boot sequence to be used to initialize a computing system. The pre-execution environment typically defines specific physical address spaces in the memory system where specific computer instructions are expected to reside.

For example, the pre-execution environment may specify that computer instructions to perform power-on self test (POST) for the processor should exist at certain memory addresses. These instructions are stored in non-volatile memory (e.g., ROM) so that the instruction will exist in memory, ready for execution, upon power up of the processor.

In addition, the pre-execution environment may specify that certain instructions to provide basic input/output services (BIOS) should exist at certain memory addresses. These instructions are likewise stored in non-volatile memory (e.g., ROM or flash). The BIOS provides basic I/O services to certain peripherals and are needed to initialize the computing system. For example, as will be explained in more detail below, to initialize the system, the boot sequence code needs to read an operating system image from a boot device (e.g., local disk) and store such in computer memory so that it may be used for execution; to read such image from the boot device, the boot sequence code needs the basic input/output service for reading information (i.e., the operating system image) from a peripheral such as a disk; the BIOS provides such service.

FIG. 1 depicts an exemplary, conventional standard PC Boot/install process, such as with Windows. As depicted, once the processor is powered on, it will automatically start to read and execute the instructions at predefined memory addresses, i.e., the addresses having the processor initialization code and POST instructions 101. This stage of boot will also contain very rudimentary instruction to go to a boot device and read a special program called an OS loader (or for some systems, it will read in the DOS operating system). To do such reading, the boot stage 1 instructions need the BIOS run time services 107 to access the associated boot device 111.

Thus, at boot stage 1, the POST and BOOT sector load stage 101 uses the BIOS including BIOS run time services 107 to load DOS or the operating system loader from local hardware 111, e.g., a local CD or floppy disk into the processor. Once the OS loader (or DOS) is loaded into processor memory, at boot stage 2, the boot sequence transfers program control to the just-loaded image (e.g., OS loader). The processor then starts executing the instructions just loaded. These instructions continue to read and load other portions of the operating system. This stage is known as a BIOS dependent stage 103, because the instructions are still using the BIOS run time services 107 to provide the instructions to read the operating system and other software from peripherals 111. At some point in the sequence, device drivers for peripherals get loaded into memory. After such a point, the boot sequence can transfer control to subsequent driver-dependent stage of boot 105. This stage may then use the device drivers 109 to perform I/O to the peripherals and to complete the boot process for the system. By using the device drivers 109, the driver dependent stage may potentially access peripherals not supported by BIOS or use peripherals supported by BIOS in a more efficient and reliable way. Once the system is booted, applications may then execute using the operating system and drivers as needed. BIOS typically is not used once the boot sequence is complete, though there are exceptions (more below).

Though the above boot sequence and approach is well known and common, it has certain disadvantages. Two disadvantages are discussed below.

First, it is cumbersome to modify the BIOS to fix bugs or otherwise improve the code. The BIOS is loaded into flash or ROM memory. To update the BIOS (in flash) normally the computer must be powered down and a special program needs to be run to update the BIOS image. To update the BIOS in ROM is even more difficult.

Second, some processing platforms do not provide the supported boot devices and thus need to utilize different approaches to booting. For example, the Egenera Blade-Frame™ processing platform allows an administrator to configure (under software control) at least one virtualized processing area network (PAN) system having one or more inter-communicating processors, each without a local disk or other boot device of any type. Thus the conventional sequence of FIG. 1 will not work, as the Boot sector load stage and BIOS dependent stage will fail.

To address its unique architecture, the BladeFrame™ processing platform uses a boot sequence like that shown in FIG. 2. The processor executes POST instructions analogous to the situation depicted in FIG. 1. However, rather than use BIOS run time services to access a boot device, the processor uses an approach involving Option ROM 204. The Option ROM 204 is accessed in a conventional way. The Option ROM 204 includes instructions to download a program from a remote device (e.g., using TFTP) and then transfers execution control to that program. The program in this case includes computer instructions to download the operating system image including special device drivers that include emulation code to emulate local peripherals with remote devices (i.e., the emulation code communicates requests over the communication fabric 206 to a remote device 211, which serves the request). The boot sequence avoids the BIOS dependent stage of FIG. 1 and proceeds to a driver dependent stage to complete booting. Thus, the approach completely avoids the use of BIOS run time services.

While the approach of FIG. 2 works, it imposes certain limitations on the system. There are some applications that expect to use BIOS run time services for operation (e.g., many operating system loaders). In addition, some operating systems expect BIOS to be present and use the BIOS runtime services even during normal (non-boot) operation.

With regard to the approach of FIG. 2, the system must be powered down and rebooted from an alternate device, typically a floppy. The operation to update the BIOS is risky as the current BIOS will be destroyed in the process of updating and any failure during that update will result in a system that is unbootable.

Consequently, there is a need for a system and method of providing a BIOS solution that addresses the above shortcomings.

SUMMARY

The present invention provides a system and method to virtualize BIOS, including run time services.

According to one aspect of the invention, a processing system has a processor, a memory system with a predefined physical address space, a storage medium, and a communication medium between the processor and the storage medium. The processing system is operable in a pre-execution environment in which a specified portion of the physical address space is used to map basic input/output system (BIOS) run time service routines. The specified portion contains RAM memory. A BIOS virtualization system includes an image of the BIOS processor-executable instructions on the storage medium and processor-executable instructions that retrieve the BIOS image from the storage medium and store the BIOS image into the RAM memory mapped into the second specified portion of physical address space.

According to another aspect of the invention, the processing system includes option rom and the option rom includes instructions for downloading a processor-executable program having the processor instructions to retrieve and store the BIOS image.

According to another aspect of the invention, the communication medium is a network.

According to another aspect of the invention, the BIOS image includes a BIOS run time service routine to service disk I/O, and includes emulation logic to convey the disk I/O requests to local disk over the network to remote hardware to service requests.

According to another aspect of the invention, the BIOS image includes a BIOS run time service routine to access a local CD.

According to another aspect of the invention, the BIOS image includes a BIOS run time service routine to access a floppy disk.

According to another aspect of the invention, the BIOS image includes a BIOS run time service routine to service serial com port communication.

According to another aspect of the invention, the option ROM instructions uses tftp to download the programs that loads the BIOS image.

According to another aspect of the invention, a method of booting a processor having no local boot devices includes executing a first phase of booting instructions to download at least a portion of BIOS image (including at least some run time service logic) into RAM, and at least some of this portion is in predefined processor memory space which the BIOS image includes at least one BIOS run time service having handler logic to emulate access to a local boot device; after the BIOS image is loaded into RAM, executing a subsequent phase of booting instructions that load an operating system into processor memory in which the subsequent phase of booting instructions use the at least one BIOS run time service having handler logic to emulate access to a local boot device.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, m ay readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE SEVERAL VIEWS OF THE DRAWING(S)

The above-mentioned and other advantages and features of the present invention will be better understood from the following detailed description of the invention with reference to the accompanying drawings, in which.

DETAILED DESCRIPTION

The following detailed description includes many specific details. The inclusion of such details is for the purpose of illustration only and should not be understood to limit the invention. Throughout this discussion, similar elements are referred to by similar numbers in the various figures for ease of reference. In addition, features in one embodiment may be combined with features in other embodiments of the invention.

One or more embodiments of the present invention provide a system and method in which BIOS run time services may be loaded into a specified memory space of RAM, not ROM, as part of the boot sequence. One advantage of this approach is that BIOS may be easily modified and updated. The BIOS image is simply updated and stored in a specified location on disk or the like. During the next initialization sequence, the BIOS image including the BIOS run time services (but perhaps lacking BIOS POST) is fetched and loaded into the physical memory space specified by the pre-execution environment. In this fashion, no special programs are needed to update the BIOS image to increase capabilities, fix bugs, or otherwise alter the BIOS image.

In addition, by using certain embodiments of the invention, the BIOS image so loaded may include unconventional capabilities. BIOSes typically include a specified set of services, but as mentioned above there may be architectures that lack boot devices or the like supported by BIOS run time services. Using preferred embodiments of the invention, a BIOS image may be loaded that includes emulation logic or other functionality not typically supported by conventional BIOS run time services. The BIOS run time services will appear conventional to the various aspects of the boot code (and other code) that use such. However, the BIOS run time services may include extended routines that, in fact, operate with a peripheral not supported by BIOS. For example, the boot code may act as if it is reading and loading the operating system from a local disk or CD drive using a BIOS run time service routine with an interface for such, but the virtualized BIOS routine (i.e., the one actually running) in fact may access a remote device using emulation techniques to access the remote device (e.g., via a network), but make it appear local.

In this fashion, under one or more embodiments of the present invention, the BIOS dependent stage (e.g., the second boot stage) is fully enabled, for example, to load the operating system image. Moreover, applications that use and expect BIOS run time services will work, because BIOS run time services will exist at the expected physical memory locations and will operate as expected (though perhaps using emulation techniques to mimic access to a peripheral corresponding to the accessed BIOS routine).

Figure 1:
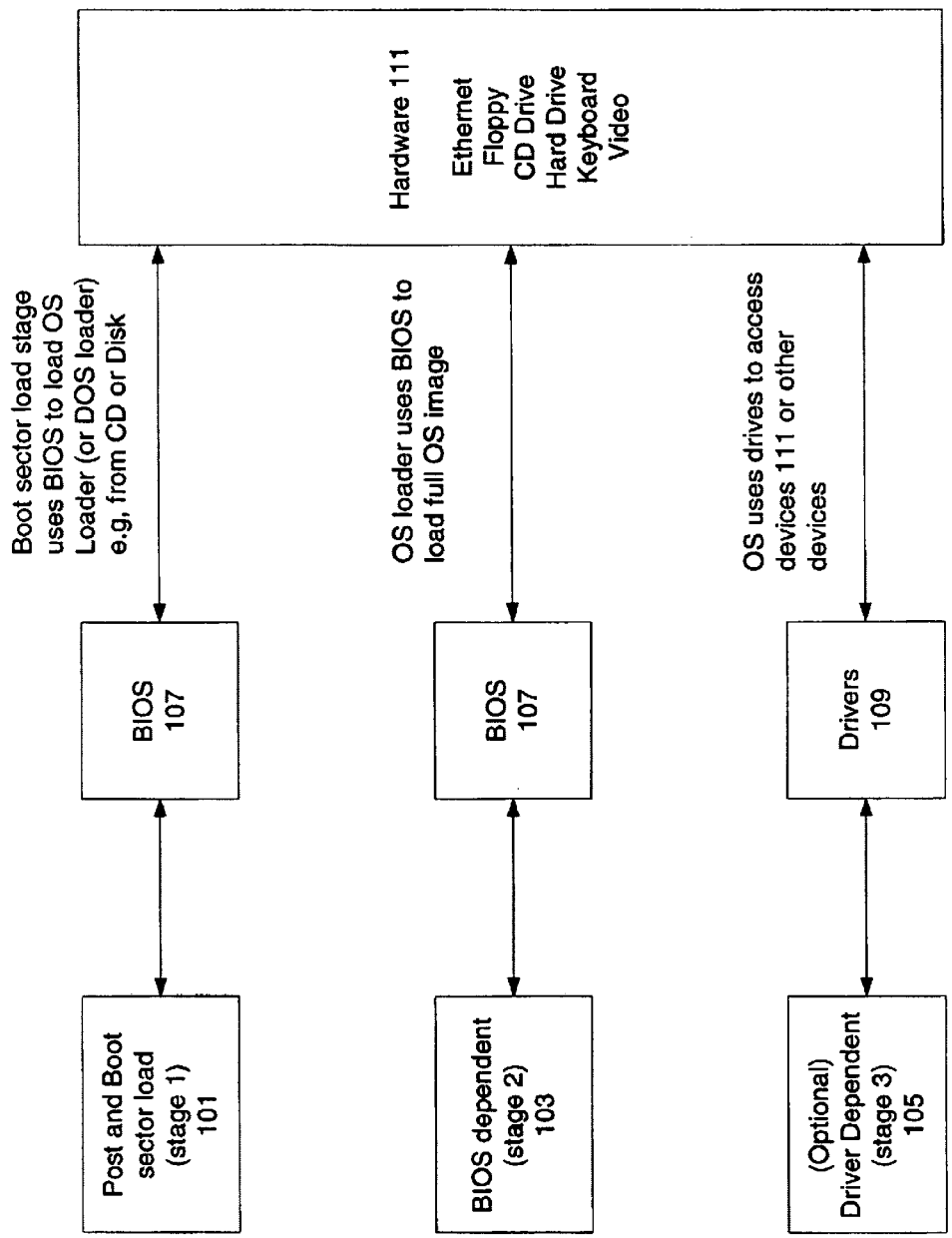
FIG. 1 depicts a prior art PC boot sequence.
Figure 3:
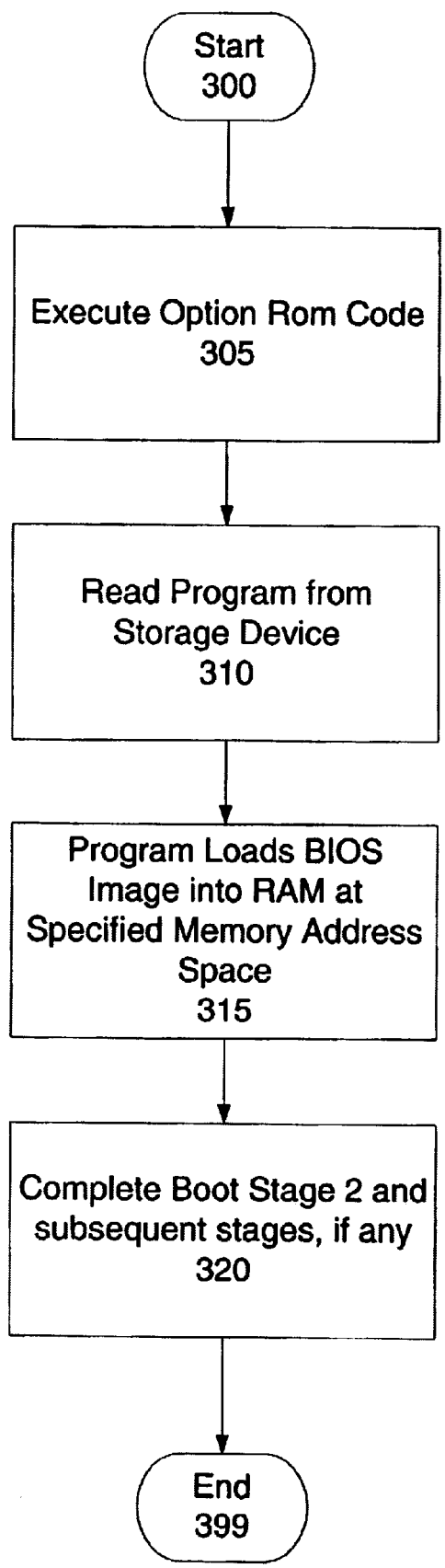
FIG. 3 illustrates the logic according to certain embodiments of the invention.

FIG. 3 illustrates the logic according to certain embodiments of the invention. The logic starts in step 300 which may relate to the processor powering on. In step 305, the processor progresses through its initialization sequence to start executing instructions in Option ROM, the scheduling of such execution being in accordance with a pre-defined pre-execution environment sequence. The Option ROM instructions proceed to step 310, during which step the instructions read a special program into memory using conventional techniques, and then transfer execution control to the just loaded special program. At step 315, the special program reads and loads a BIOS image (including BIOS run time services) from a storage device. This is the virtualized BIOS image. Under certain embodiments the BIOS image may reside on a local storage device, but under certain preferred embodiments the BIOS image may reside on a remote device (i.e., not a supported boot device). In either case the program loaded by Option ROM has the knowledge to access the correct device having the BIOS image. The virtualized BIOS image of preferred embodiments includes at least a subset of BIOS run time services, though implemented with extended functionality (more below). The BIOS image is loaded into RAM at predefined memory locations specified by the pre-execution environment as the memory space for BIOS (e.g., shadow RAM, but in this case accessed by the processor). Once the BIOS image is loaded into RAM at the specified memory space, the logic proceeds to step 320 and the boot sequence continues. In certain embodiments, this continuation may begin with a boot sector load and BIOS-dependent boot akin to that described in connection with FIG. 1 (though as explained below perhaps by accessing remote hardware). It may also continue with conventional POST sequence, though this may be redundant with earlier operations.

Figure 2:
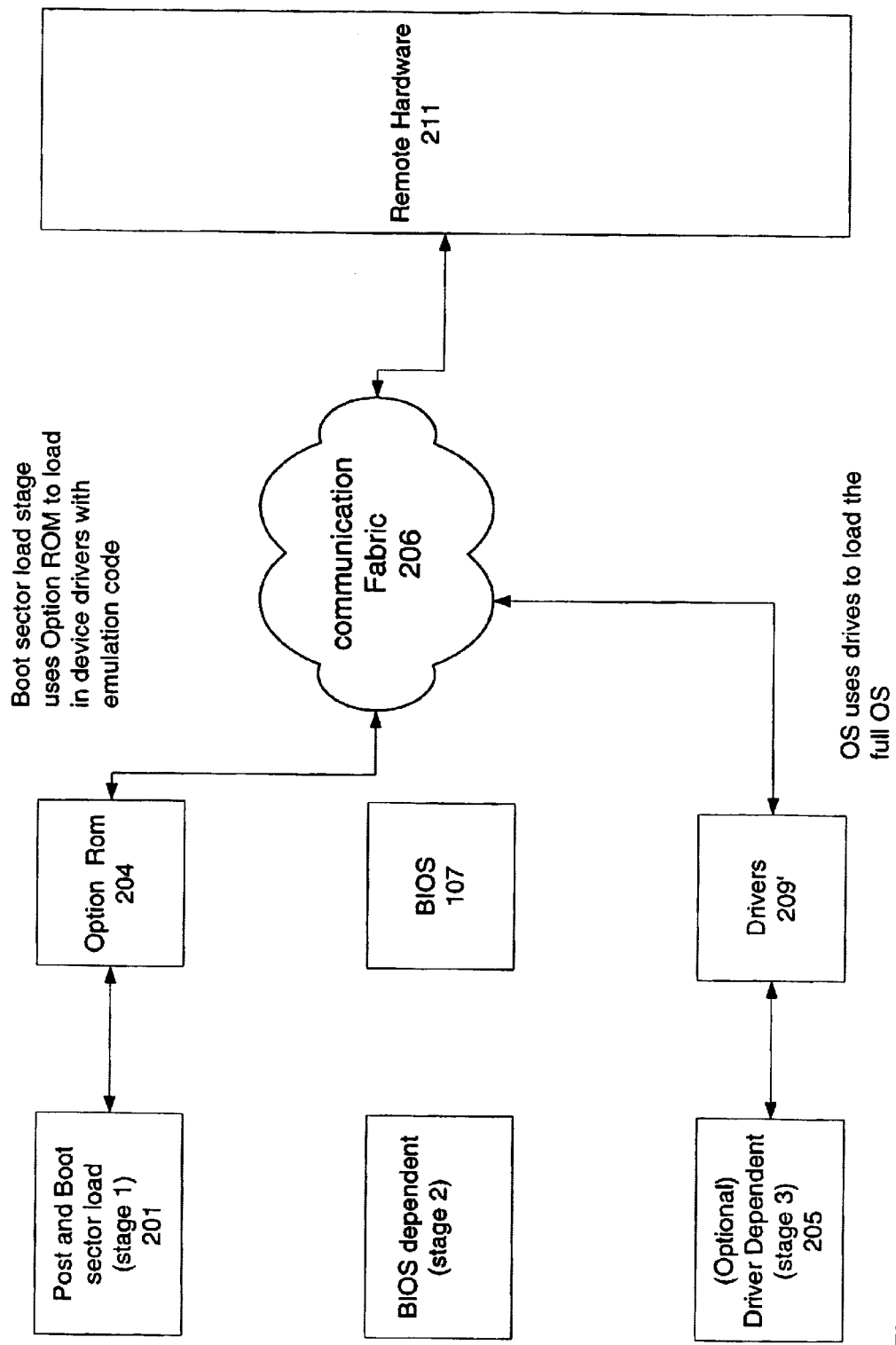
FIG. 2 depicts a prior art boot sequence for a processing system lacking attached boot devices.
Figure 4:
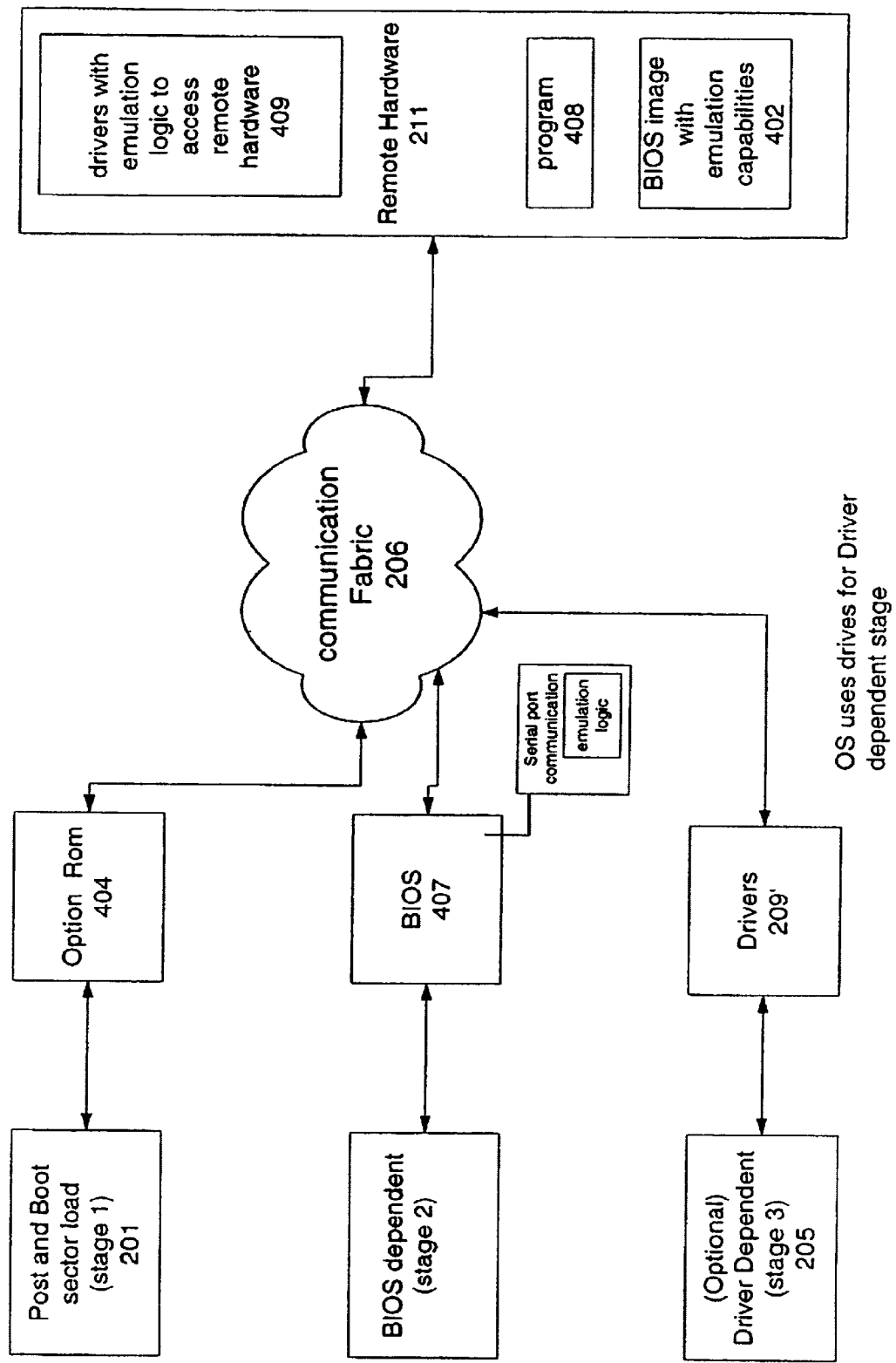
FIG. 4 depicts a boot sequence according to certain embodiments of the invention.

Reference is now made to FIG. 4, illustrating a particular embodiment of the invention adapted for a platform analogous to that of FIG. 2. The process starts analogous to FIG. 2 with the invocation of Option ROM 404.

The Option ROM 404 has the same instructions as that in FIG. 2 but in this instance it downloads (e.g., via tftp) a different program 408. The program 408 contains instructions for fetching BIOS image 402 and storing it into the memory system address space 407 reserved for BIOS by the predefined pre-execution environment (e.g., in Shadow RAM). Under preferred embodiments, the BIOS run time services 407 include at least run time service routines for accessing a local disk (e.g., as a boot device). The local disk routine emulates access to a local disk requests by instead sending the request over the communication fabric 206 to remote hardware 211 to server the request. The remote hardware may include a remote node with attached or networked peripherals to serve the request. Under some embodiments, the local disk routine wraps disk requests in packets or cells to transmit such on the fabric 206 to a corresponding remote hardware entity 211 to serve the request, and the local disk routine unwraps replies received from the remote entity 211. The remote hardware 211 operates analogously, i.e., unwrapping requests and wrapping replies. Of course the technique depends on the medium being used.

The program 408 also includes boot sector load instructions which will execute after the BIOS image 407 is loaded in processor memory. The boot sector load instructions will fetch an OS loader (or the like) as described above, but in this instance using the virtualized BIOS just loaded. In, this fashion BIOS dependent boot stages may be executed (instead of avoided) and BIOS 407 will be available for subsequent use by the operating system or other software. During the loading of the operating system by the OS loader (or the like) drivers 409 will be loaded into the processor memory. These will likewise include emulation logic as needed so that, for example, requests for local disk may be emulated with a driver 409 that emulates such a request by conveying it over the fabric 206 analogously to that described above in conjunction with the description of the BIOS run time service 407.

The above description focused on a virtualized BIOS run time service to emulate local disk access. The embodiment, however, is not so limited. For example, the above technique may be used to download a run time service used in conjunction with emulating serial corn port communication. U.S. patent application Ser. No. TBD, filed on even date herewith, and entitled System and Method for Emulating Serial Com Port Communication for example describes a serial corn port emulation technique that may benefit from embodiments of this invention.

Local disk emulation (including CD ROM) or local floppy emulation may be obtained by using the above techniques, in certain embodiments, in conjunction with BIOS run time service routines (i.e., handlers) for INT 0×13 calls. For emulation of serial corn port communication, INT 0×10 calls are emulated. The handlers of a conventional BIOS image may be replaced with the new handlers having emulation capabilities, or the new handler code may be added to a conventional image and the dispatch tables may be modified to redirect calls to the new routines.

The foregoing detailed description includes many specific details. The inclusion of such detail is for the purpose of illustration only and should not be understood to limit the invention. In addition, features in one embodiment may be combined with features in other embodiments of the invention. Various changes may be made without departing from the scope of the invention as defined in the following claims.

As one example, the computer system may include a general purpose computer, or a specially programmed computer. A computer system may be implemented as a distributed computer system rather than on a single computer processor. Similarly, a communications network may be employed which may be, by way of example, a packet communications network, the Internet, an intranet, an Ethernet, or other networks. Moreover, processing could be controlled by a software program on one or more computer systems or processors, or could even be partially or wholly implemented in hardware.

The method of the invention may have been described in connection with particular steps. The present invention is not limited to a particular order of steps. It is intended to be provided in any order of steps where possible.

By utilizing one or more embodiments of the present invention, not only is it possible to load Windows onto the processor, it is also possible to install other Operating Systems from CD; for example, Linux. This may make possible an advanced server hardware configuration. Moreover, the remote floppy and/or remote CD-ROM may be accessed, e.g., through a controller processor driver. Optionally other operating system loaders in addition to LILO may be supported; and/or LILO may be run in interactive mode. In addition, the ability to boot and run DOS from a remote device makes possible, inter alia, a straightforward firmware upgrade and/or remote diagnostics and/or "patches" without firmware upgrade.

Hence, with one or more embodiments of the present invention, platform independence is enabled. The present invention also renders the system less dependent on the operating system.

Under preferred embodiments, the processing system includes option rom and the option rom includes instructions for downloading a processor-executable program (e.g., the loader) having the processor instructions to retrieve and store the BIOS image. The option rom and the instructions in the option rom are prior art (tftp boot). The option rom downloads the image and that image contains a loader and the virtual BIOS instructions. The loader places the virtual bios instructions into memory. The virtual bios image includes at least some of the run time services, and at least some of the virtual bios image is stored in predefined memory space having RAM. For example, this portion may be the interrupt vector table, but other portions may be as well. For example, the predefined address may correspond to a first instruction of a service routine, and this instruction may jump to some other address.

Under preferred embodiments, a method of booting a processor having no local boot devices includes executing a first phase of booting instructions to download at least a portion of BIOS image (including at least some run time service logic) into RAM, and at least some of this portion is in predefined processor memory space which the BIOS image includes at least one BIOS run time service having handler logic to emulate access to a local boot device; after the BIOS image is loaded into RAM, executing a subsequent phase of booting instructions that load an operating system into processor memory in which the subsequent phase of booting instructions use the at least one BIOS run time service having handler logic to emulate access to a local boot device.

Under certain embodiments, when the portion of BIOs image is downloaded into RAM, the technique loads a portion of the vector table (of BIOs) which is loaded into predefined memory space (i.e., where the processor architecture expects the vector table to reside, albeit convention this address space is populated with ROM memory, not RAM). Specifically, the VECTOR for INT 13 is at 13*4 hex. If we load the handler for INT 13 at 1000, then we set the fixed address 13*4 to 1000. If we load the handler at 2000, then we set the fixed address 13*4 to 2000. The vector is poked by the loader—it is not downloaded. The handler, which is downloaded, can go anywhere, so long as the vector points to it.

As outlined above, preferred embodiments of the invention provide the ability to virtualize at least certain portions of BIOs, such as the run time services and this provides unique advantages. For example, implementing and distributing bug fixes to BIOs is easier.

Preferred embodiments of the invention provide at least some BIOS run time services that include emulation logic. For example, the processor nodes having the BIOs might lack local disk, local floppy, and local CD. Preferred embodiments provide BIOs run time services which emulate such local storage by wrapping the storage requests and conveying such wrapped requests over an alternative transport such as communication fabric 206. Communication fabric may be an essentially arbitrary medium and specifically includes packet and cell-based medium, but may also include frame-based, or TDM-based approaches as well. Moreover, the protocol for communication over the communication fabric may be entirely decoupled from the type of device being emulated with BIOs run time service.

For example, U.S. patent application Ser. No. 10/038,354, filed Jan. 4, 2002, entitled Address Resolution Protocol System and Method in a Virtual Network, published on Oct. 24, 2002 (which is hereby incorporated by reference in its entirety) described a processing platform in which processor nodes may inter-communicate over a Giganet fabric. Preferred embodiments may be utilized on such a platform so that BIOs run time services may be conveyed to another node (e.g., control node) communicating on the fabric which may then serve the request. Indeed, the logic handling the request may be far removed provided that the emulation logic addresses its request to a node that, in turn, has capabilities for forwarding the request to an appropriate node (which may be a serving node or another forwarding node).

The emulation logic for the BIOs run time service is similar to the logic used in device drivers that provide emulation, such as those used in the art. However, those techniques have not been used in the context of BIOs run time services.

Under preferred embodiments, emulation logic for BIOS disk services involves first translating INT 13 functions to SCSI packets, then transmitting the SCSI packets over the medium for service by a control node such as that described in the incorporated patent application. (OS device drivers typically do not service INT 13 calls, but handle SCSI packet requests directly.) The INT 13 to SCSI translation mechanism, where the SCSI device is a local disk, is known in the art.

Emulation logic for BIOS console services involves directly transmitting serial traffic over the medium as described in the U.S. patent application Ser. No. TBD, filed on even date herewith, and entitled System and Method for Emulating Serial Corn Port Communication. In this case, the method is basically the same as an OS device driver connected to COM2 in the serial port patent.

Moreover, the invention is not limited to any particular operating system. The invention has been discussed in connection with a particular example of an operating system, however, the principals may apply equally to other operating systems. Similarly, the invention may be provided in connection with a BIOS and/or any other stage of operating system and/or application software.

What is claimed is:

1. In a processing system having a processor, a memory system, a storage medium, and a communication medium, between the processor and the storage medium, and wherein the processing system is operable in a pre-execution environment in which a specified portion of the physical address space is used to map at least a portion of a basic input/output system (BIOS) and wherein the BIOS includes run time service routines that include service routines for a predefined set of peripheral devices, and wherein the specified portion contains RAM memory, a BIOS virtualization system comprising:

an image of BIOS processor-executable instructions on the storage medium, and including at least some BIOS run time service logic and wherein the BIOS run time service logic includes logic for emulating at least one peripheral device from the predefined set of peripherals, said emulating logic using said communication medium; and processor-executable instructions that retrieve the BIOS image from the storage medium and store the BIOS image into the RAM memory such that the portion of BIOS is loaded into the specified portion of physical address space.

2. The system of claim 1 wherein the processing system includes option rom and the option rom includes instructions for downloading a processor-executable program having the processor instructions to retrieve and store the BIOS image.

3. The system of claim 1 wherein the communication medium is a network.

4. The system of claim 3 wherein the BIOS image includes a BIOS run time service routine to access a local disk, and the BIOS run time service routine to access a local disk includes emulation logic to convey requests to local disk over the network to remote hardware to service requests.

5. The system of claim 3 wherein the BIOS image includes a BIOS run time service routine to access a local CD and the BIOS run time service routine to access a local CD includes emulation logic to convey requests to CD over the network to remote hardware to service requests.

6. The system of claim 3 wherein the BIOS image includes a BIOS run time service routine to access a floppy disk and the BIOS run time service routine to access a floppy disk includes emulation logic to convey requests to floppy disk over the network to remote hardware to service requests.

7. The system of claim 3 wherein the BIOS image includes a BIOS run time service routine to service serial com port communication and the BIOS run time service routine to service serial com port communication includes emulation logic to convey the serial com port communication over the network to remote hardware to service requests.

8. A method of virtualizing basic input/output system (BIOS) run time service routines that include service routines for a predefined set of peripheral devices, comprising:

retrieving the BIOS image from a storage medium, the BIOS image including at least some run time service logic and wherein the BIOS run time service logic includes logic for emulating at least one peripheral device from the predefined set of peripherals, said emulating logic using a communication medium; and loading the BIOS image into RAM memory such that at least a pre-specified portion of the BIOS image is loaded into a specified memory space of RAM.

9. The method of claim 8 wherein the act of retrieving includes the acts of executing option ROM instructions to download and execute a program in which the program includes instructions for retrieving the BIOS image.

10. The method of claim 9 wherein the option ROM instructions download the program using tftp.

11. The method of claim 8 wherein the BIOS image is retrieved over a network.

12. A method of booting a processor having no local boot devices, comprising:

executing a first phase of booting instructions to download a BIOS image into RAM in predefined processor memory space reserved for the BIOS image and in which the BIOS image includes service routines for a predefined set of peripheral devices and includes at least one BIOS run time service having handler logic to emulate access to a local boot device and wherein BIOS run time service logic includes logic for emulating at least one peripheral device from the predefined set of peripherals, said emulating logic using a communication medium;

after the BIOS image is loaded into RAM, executing a subsequent phase of booting instructions that load an operating system into processor memory in which the subsequent phase of booting instructions use the at least one BIOS run time service having handler logic to emulate access to a local boot device.

13. A processing system having a processor, a memory system, and a communication medium being one of a packet-based, cell-based, frame-based or TDM-based medium, and wherein the processing system is operable in a pre-execution environment in which a specified portion of the physical address space is used to map at least a portion of the basic input/output system (BIOS) and wherein the BIOS includes run time service routines that include service routines for a predefined set of peripheral devices, a BIOS emulation system comprising:

wherein BIOS run time service routines include logic for emulating at least one peripheral device from the predefined set of peripherals, said emulating logic using said communication medium; and at least one BIOS run-time service that includes emulation logic that is responsive to BIOS calls from the processor and that conveys the BIOS call over the communication medium to be serviced remotely.

* * * * *